3,654,201
POLYMERIC DISPERSIONS STABILIZED BY
VINYL OXAZOLINE POLYMERS
Said K. Mansour and John W. Rehfuss, Valley Station,
Ky., assignors to Celanese Coatings Company, New
York, N.Y.
No Drawing. Filed Jan. 19, 1970, Ser. No. 4,132
Int. Cl. C08f 45/44
U.S. Cl. 260—23                                  12 Claims

ABSTRACT OF THE DISCLOSURE

Novel synthetic polymeric dispersions comprising an organic liquid medium, a dispersed polymer of ethylenically unsaturated monomers and a polymeric stabilizer of monomers of the general formula:

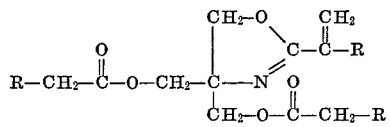

are prepared. In this dispersion the stabilizer is at least swollen by the organic liquid medium while the dispersed polymer is substantially insoluble in this medium. These dispersions are useful especially in their pigmented form in preparing protective coatings for various substrata.

BACKGROUND OF THE INVENTION

This invention relates to polymeric dispersions in various organic liquid media and to the process for preparing same.

Polymeric dispersions are well known in the art and have been shown to possess several unique improvements over standard solution vinylidene polymer lacquers or enamels. Included among these advantages are lower cost solvents, higher handling solids and molecular weight and improved viscosity control.

Various substances have been suggested as useful in stabilizing polymeric dispersions. For example in U.S. Pat. 3,095,388, rubber is disclosed as a useful dispersion stabilizer; in U.S. Pat. 3,198,759 a dibasic acid modified alkyd resin is disclosed; in U.S. Pat. 3,218,287 a monobasic aliphatic acid modified polymer is used; in U.S. Pat. 3,232,903 homopolymers of 4–18 carbon alkyl esters of methacrylic or acrylic acids are disclosed; in U.S. Pat. 3,255,135 oxidized vegetable and animal oils are disclosed as useful in forming stable polymeric dispersions; and U.S. Pat. 3,365,414 discloses the use of alkylated melamine resins as stabilizers for hydroxy or carboxylic acid containing polymeric dispersions. However many of these previously disclosed polymer dispersions have poor adhesion especially to non-porous materials such as metal or glass.

SUMMARY OF INVENTION

It has now been found that by preparing polymeric dispersions using the methods and compositions hereinafter described, it is possible to obtain films which have improved adhesion to metal or glass without a corresponding loss in water or chemical resistance.

The polymeric dispersions of this invention contain an organic liquid medium, a vinyl oxazoline polymeric stabilizer and a dispersed polymer of ethylenically unsaturated monomers. In this dispersion the vinyl oxazoline stabilizer acts to maintain the dispersion polymer in a dispersed or dispersable state. The organic liquid medium is selected so that the dispersed polymer is substantially insoluble therein, but so that the vinyl oxazoline stabilizer is at least swollen thereby. In other words the vinyl oxazoline stabilizer is either soluble in this medium or at least swollen by the action of the medium thereon.

The dispersions of this invention are prepared by polymerizing ethylenically unsaturated monomers in the presence of a vinyl oxazoline stabilizer and an organic liquid medium. This process results in a polymer which is uniformly dispersed in the medium.

DESCRIPTION OF INVENTION

Liquids which can be used as the organic medium of this invention can be present as a single compound or in mixtures and can be aliphatic, aromatic or naphthenic. Likewise these liquid materials can contain alcohol, phenol, carboxylic acid, ester, ether, or ketone groups. Included are nitro-propane, pentane, n-hexane, cyclohexane, n-heptane, n-octane, iso-octane, benzene, toluene and xylene. Also included are commercially available hydrocarbon mixtures such as mineral spirits, gasoline, pine oil, xylene mixtures, solvent naphthas, VM&P naphthas, octane fractions and the like. Among the functional group containing organic liquids are included: the alcohols such as methanol, ethanol, the propanols, the butanols, diacetone alcohol; the phenols such as phenol and cresol; the liquid carboxylic acids such as acetic acid, acrylic acid, methacrylic acid and the like; the esters such as butyl acetate, ethyl acetate, Cellosolve acetate, butyl Carbitol acetate, etc.; the ethers such as ethyl Cellosolve, methyl Cellosolve, butyl Cellosolve, Carbitol and the like; and the ketones such as methyl ethyl ketone, methyl isobutyl ketone, acetone, diethyl ketone, cyclohexanone, etc. In addition to the above listed materials small amounts—up to about 30% based upon the total medium composition—of other liquids such as water, dimethyl formamide, carbon tetrachloride, and dimethyl sulfoxide can be used. Furthermore, any of the monomers listed hereinafter can also be used as the organic medium of this invention.

It is essential that the organic medium which is employed be liquid at the temperature at which polymerization of the monomers used herein occurs. However, these liquids can have a wide range of boiling points depending largely upon the end use of the particular dispersion. Suitable dispersions can be prepared when the liquid medium has a boiling point from about 100° F. to about 500° F. For most purposes though, a boiling point range of about 200° F. to about 450° F. is preferred.

When selecting a particular organic medium the solubility of both vinyl oxazoline stabilizer and the polymer which is to be dispersed must be considered. The dispersed polymer itself should be substantially insoluble in the organic medium, i.e., not more than about 10% by weight soluble therein. Levels higher than this can lead to high viscosity dispersions. On the other hand the vinyl oxazoline stabilizer should be at least swollen by the above organic media. By at least swollen, it is meant that the organic medium should either solubilize the vinyl oxazoline polymer or at least act to swell or puff it. In instances where the vinyl oxazoline polymer is insoluble in the liquid organic media, unstable grainy dispersions usually result. Preferably the vinyl oxazoline stabilizer should be substantially soluble in the organic liquid used herein.

The viscosity of the finished dispersion can be controlled by a careful selection of the organic medium mixture. For example, a very low viscosity dispersion prepared in a naphtha liquid can be converted to a higher viscosity dispersion by replacing various amounts of the naphtha with a higher solvency organic liquid such as an ester, ketone or alcohol.

The preferred organic media useful herein are the various mixtures of solvent or VM&P naphthas and alcohols, ketones, esters or high aromatic containing organic liquids. This mixture is particularly preferable where the dispersion is to be applied by spraying over a metal or primed metal substrate. Such mixtures while generally inexpensive give excellent spray properties with rapid evaporation rates.

The vinyl oxazoline monomers useful in preparing the polymeric stabilizers of this invention can be represented by the general formula:

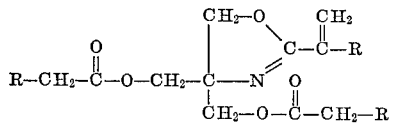

Materials having the above structure can be prepared as follows:

Tris(hydroxy methyl)amino methane is condensed with at least two and preferably 3 mols of a carboxylic acid to form an ester amide:

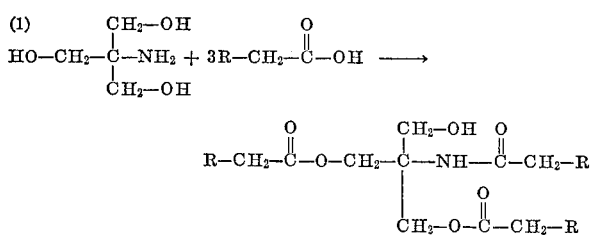

The ester amide is a tautomer and can have either of the following structures:

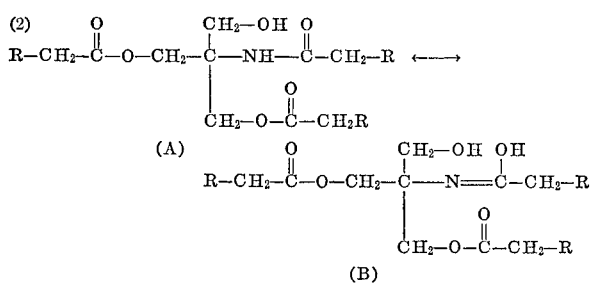

Compound B can be dehydrated to form the oxazoline ring:

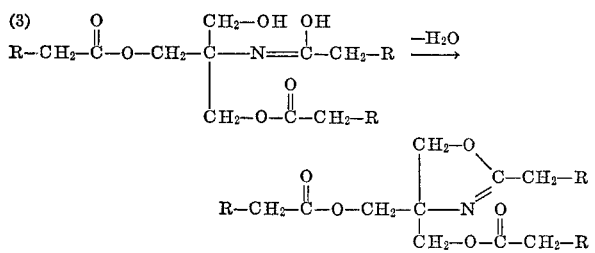

This oxazoline containing compound can then be further reacted with an aldehyde such as formaldehyde and dehydrated to form a vinyl oxazoline monomer:

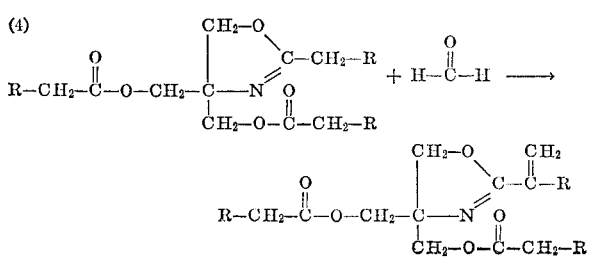

In the above reaction sequence R can have from about 2 to 28 carbon atoms and can be derived from any of those compounds commonly known as fatty acids including the saturated acids such as butyric, isovaleric, caproic, caprylic, capric, lauric, myristic, palmitic, stearic, archidic, behenic, lignoceric, cerotic, etc.; the unsaturated acids such as decylenic, dodecylenic, palmitoleic, oleic, ricinoleic, petroselinic, vaccenic, linoleic, linolenic, eleostearic, licanic, parinaric, tariric, gadoleic, archidonic, cetoleic, erucic, nervonic, etc. Also included are the fatty acid mixtures and fatty acids derived from the following oils: castor, cocoanut, corn, cottonseed, linseed, oiticica, perilla, poppyseed, rapeseed, safflower, soybean, sunflower, tung, etc. Of particular usefulness are the fatty acid containing materials known as tall oil acids or tall oil fatty acids These acids can contain from about 0.5 to about 10 weight percent of rosin acids. Thus the R group can be derived from any of the various commonly known carboxylic acids having from 2–30 carbon atoms per molecule.

The above monomers can be formed into the dispersion stabilizers of this invention by conventional polymerization methods using normal polymerization initiators or catalysts. Thus the above monomers can be added to a reaction flask along with a portion of the organic medium. This solution is then heated to reaction temperature and a solution of the particular polymerization initiator and an additional amount of the organic medium is added. Other methods of polymerization include bulk polymerization of the above monomers without the aid of the organic medium and polymerization by the use of incremental monomer additions. Catalysts or initiators for this polymerization can include any of those listed hereinafter as useful in forming the dispersed polymers of this invention.

Although it is preferred to "pre-polymerize" the above monomers to a polymerized state before carrying out the dispersion process of this invention, an alternate stabilizer polymer formation method is available. Instead of "prepolymerizing" the above stabilizer to a polymeric state this polymer can be prepared in situ during the actual dispersion polymerization. Thus the above monomer can be added to the dispersion reactor along with a portion of the desired polymerization initiators. This solution is then heated to reaction temperature and an addition of the dispersion monomers is carried out. During this addition, stabilizer polymer is formed concurrently with the dispersion polymer.

The stabilizer polymers of this invention can be either homopolymers of the above described vinyl oxazoline monomers, or copolymers of the above monomers with the monomers listed hereinafter as useful in preparing the dispersed polymers of this invention. Furthermore the vinyl oxazoline monomers can be polymerized with monomers containing other functional groups such as unsaturated acids or alcohols. The resulting copolymer can then be further reacted with complementary functional groups to produce the stabilizers useful herein. For example, a vinyl oxazoline monomer can be reacted with maleic anhydride and then the resulting product further reacted with hydroxy containing materials such as a polyol. Preferably, in any of these copolymers, the vinyl oxazoline monomer should be present at at least the 40% level to insure that the copolymer is at least swollen by the organic medium and to insure a sufficient degree of adhesion of the finished, applied dispersion to its substrate.

The amount of vinyl oxazoline copolymer or homopolymer that can be used as a stabilizer for the polymeric synthetic dispersions of this invention can vary from about 1.0 to 50 weight percent based on the total dispersion solids weight. When less than about 1.0 weight percent oxazoline stabilizer is used the resulting dispersions are unstable and have grainy films. On the other hand when levels in excess of 50 weight percent are used the resulting dispersions are thick and require a reduction in solids to such an extent that their use is impractical. Most preferably the stabilizer level should be in the range of about 2 to 15 weight percent.

The above vinyl oxazoline stabilizer can be used in admixture with other precursors well known in the art including oxidized vegetable or animal oils, long chained alkyl acrylate or methacrylate homopolymers, e.g., polylauryl methacrylate, natural or synthetic rubbers, various fatty acid modified polyester resins and the like.

The various ethylenically unsaturated monomers which can be formed into the dispersed phase polymers of this invention can be selected from a wide variety of acrylic and vinyl monomers such as the vinyl esters of fatty acids having from 1 to 18 carbon atoms including vinyl acetate, vinyl propionate, vinyl butyrate, vinyl laurate, vinyl oleate, and vinyl stearate. Esters of acrylic acid or of methacrylic acid with alcohols having from 1 to 18 carbon atoms can likewise be employed. Examples include methyl acrylate or methacrylate, ethyl acrylate or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acrylate or methacrylate, n-hexyl, 2-ethyl hexyl, n-octyl, t-octyl, dodecyl, hexadecyl, or octadecyl acrylates or methacrylates. Acrylonitrile, methacrylonitrile, acrylamide, methacrylamide, styrene, α-methyl styrene, vinyl toluenes, acrylic acid, acrylic acid anhydride, methacrylic acid, methacrylic acid anhydride, maleic anhydride, fumaric acid, crotonic acid, allyl acetate, glycidyl methacrylate, t-butylaminoethyl methacrylate, hydroxyalkyl acrylates, or methacrylates such as β-hydroxyethyl methacrylate, β-hydroxypropyl methacrylate, β-hydroxyethyl vinyl ether, β-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, and tetrafluoroethylene may also be used as the monomers for preparing the dispersed phase polymer. The preferred monomers for use in this invention are the alkyl acrylates and methacrylates. Most preferred among these monomers, especially when the end use of the dispersion is in automotive coatings, is methyl methacrylate or mixtures containing a major amount of methyl methacrylate and a minor amount of a flexibilizing monomer such as butyl acrylate, ethyl acrylate, etc.

The basic process for preparing the dispersions of this invention comprises addition polymerizing any of the above described ethylenically unsaturated monomers to a polymeric dispersed state in an organic liquid medium in the presence of any of the previously described vinyl oxazoline polymers. Compounds useful in initiating the formation of the above dispersed addition polymers include those known in the art as free radical catalysts or initiators. These catalysts are generally of the azo or peroxygen type including benzoyl peroxide, lauroyl peroxide, acetyl peroxide, cumene hydroperoxide, paramethane hydroperoxide, azodiisobutyronitrile, dimethyl azodiisobutyrate, tertiary butyl peroctoate, tertiary butyl perbenzoate, ditertiary butyl peroxide, methyl ethyl ketone peroxide, hydrogen peroxide and so on. Free radical catalysts which are activated by means of amines such as triethylenetetramine and those activated by various salts such as cobalt naphthenate are also suitable. In general any free radical catalyst that can be used for solution or bulk polymerization of the monomers described above can also be employed in the present invention. The amount of free radical catalyst that is used can be from about 0.1% to about 5.0% of the monomer weight. Generally the catalyst can be added all at once or in portions at periodic intervals. Preferred among the above free radical catalysts is tertiary butyl peroctoate.

Instead of employing a free radical polymerization initiation system a cationic initiation system can be used. Useful examples of this type include the conventional Friedel-Crafts or Lewis acid catalysts such as aluminum chloride, stannic chloride, boron fluoride and its complexes such as the etherates, titanium tetrachloride, aluminum bromide, sulfuric acid and the like. The preferred amount of catalyst or initiator used in this system is about 0.1 to 2.0% based on the total monomer content.

Still other useful types of polymerization catalysts include the anionic systems. The catalysts useful in forming these systems include materials such as butyllithium, butyl magnesium bromide, phenyl magnesium bromide, triphenyl methyl sodium, sodium naphthalene, 9-fluorenyllithium, dipotassium stilbene, etc. The proportion of this catalyst preferably is in the range of from about 0.1 to 5% based on the weight of the monomers.

Many well known methods of polymerization can be employed in preparing the dispersions of this invention. In the simplest method the vinyl oxazoline polymer is added to the organic medium along with a portion of the polymerization initiators or catalysts. This mixture is then heated to the desired temperature (anywhere between room temperature and the reflux temperature of the organic medium depending upon the reactivity of the particular catalyst) and held at this temperature for the desired length of time. Preferably polymerization is carried out at a temperature of about 125° F.–250° F. The monomers are then added over from about 15 minutes to 4 hours or longer and the polymerization mixture is held at reaction temperature until polymerization is complete as evidenced by a minimal concentration of free, unreacted monomer. Variations on this procedure include: (1) heating the vinyl oxazoline stabilizer-organic medium mixture to the desired temperature and then concurrently adding the monomers and the initiator over a predetermined period of time at the desired temperature; (2) adding a portion of the monomers to the stabilizer-organic medium-initiator mixture, holding this mixture at the desired temperature for a predetermined amount of time and then adding the remainder of the monomers and in some instances additional amounts of the initiator; (3) mixing the monomer, vinyl oxazoline stabilizer, organic medium and catalyst, heating this mixture to reaction temperature and holding for complete monomer conversion; and (4) forming a mixture as in number 3 except without the catalyst and then heating the mixture to reaction temperature and adding the catalyst over the desired length of time. However, the preferred process is carried out in 3 separate steps. In the first step the vinyl oxazoline stabilizer, the organic medium and a portion of the initiator or catalysts are mixed and heated to reaction temperature. Then a portion of the monomer is added in the second step. Finally an addition of the remainder of the organic medium, initator and monomer is carried out as the third step. Variations on this preferred process include replacing the organic medium with a portion of the monomer in the first step and then carrying out as the second step an addition of a portion of the organic medium. In other variations the first step can include only the vinyl oxazoline stabilizer and a portion of the monomer while the second step includes a mixture of portions of both the organic medium and the initiator. Using any of the above procedures it may be necessary in order to increase the amount of monomer conversion to add additional amounts of catalyst or initiator after all of the initial catalyst has been added. Furthermore other variations on these procedures are possible and are well known in the art.

Chain transfer agents are in most cases not required in order to form the dispersions of this invention. Preferably, however, they should be included in order to control the molecular weight and molecular weight distribution of the dispersed phase polymer. Included among these chain transfer agents are phenol, chloroform and carbon tetra chloride. Also included are mecaptans such as n-propyl mercaptan, n-butyl mercaptan, tertiary butyl mercaptan, n-octyl mercaptan, n-dodecyl mercaptan, tertiary dodecyl mercaptan, lauryl mercaptan, ethyl thioethanol, thiophene, thiophenol, toluene thiol, xylene thiol, phenyl disulfide, thioanisole, 4-tertiary butyl thiophenol and 4-nonyl thiophenol. Preferred among these chain transfer agents are aliphatic mercaptans especially those which are soluble in the organic medium, e.g., lauryl mercaptan. Although these chain transfer agents can be present in amounts varying from 0.1 to 1.5 weight percent based upon the total dispersion solids, best results are obtained when they are present in the 0.25 to 0.75 weight percent range. These chain transfer agents can be added at any time during the course of the dispersion formation. However, in the preferred instances they are added along with the polymerization monomers.

The polymeric dispersions of the present invention are adapted to be modified by the incorporation of drying oils and fillers as well as plasticizers, coalescing aids and polymeric or resinous materials which are soluble in the organic medium including fatty acid modified shellac, gums, natural resins, epoxidized fatty oils, coal tar, cumarone-indene resins, asphalts, bitumens, epoxy resins, alkylated methylated aminoplast resins including condensations of formaldehyde with urea, melamine, thiourea, benzoguanamine, or ethyleneurea alkylated with a 1 to 6 carbon alcohol, such as butanol. Among other materials that can be incorporated are the alkyd resins, organic soluble vinyl and acrylic resins with or without plasticizers.

Dispersions formed in this manner are milky white in color and have excellent properties when applied in their pigmented form over metal or primed metal. These pigmented dispersions which are prepared using normal pigments and pigmentation methods are of special use in automotive top coating, coil coating, can coating and other metal decorating areas. However, they can also be applied to any conventional substrate such as glass, plastic, wood, paper or leather by any of the several normal application methods, e.g., brushing, spraying, dip-coating, or electro-coating.

In the following examples parts and percentages unless otherwise specified are understood to be by weight.

EXAMPLE A

Into a reaction flask equipped with a mechanical agitator, thermometer, reflux condenser and addition funnel were added 720 parts of a vinyl oxazoline monomer similar in structure to the product of Formula 4 above and based upon the reaction of tris(hydroxy methyl) amino methane and a tall oil fatty acid, and 80 parts of mineral spirits. This monomer, at 100% solids, exhibited a Gardner-Holdt 25° C. viscosity of H, a Gardner color of six, an acid value of eight, and a weight per gallon of 7.80 lbs. This mixture was heated to 368° F. and a two hour addition of 22.6 parts of ditertiary butyl peroxide and 617.4 parts of mineral spirits was carried out. The resulting mixture was held at 292° F. for eight hours and 14.4 additional parts of ditertiary butyl peroxide were added. Holding this mixture for about 6½ more hours at 290° F. produced a vinyl oxazoline homopolymer having a Gardner-Holdt (25° C.) viscosity of F–G at 50% solids in mineral spirits.

EXAMPLE B

Into a reaction flask equipped as in Example A were added 200 parts of the vinyl oxazoline monomer used in Example A, two parts of ditertiary butyl peroxide and 82 parts of mineral spirits. This mixture was heated to 356° F. and held for two hours. A mixture of six parts of ditertiary butyl peroxide and 110 parts of mineral spirits was added over two hours reducing the reaction temperature to 330° F. The resulting reaction mixture was held at 327° F. for 7 hours and 40 minutes producing a vinyl oxazoline polymer having a Gardner-Holdt 25° C. viscosity of C at 50% solids in mineral spirits.

EXAMPLE C

Into a reaction flask equipped as in Example A were added 200 parts of the vinyl oxazoline monomer used in Example A, six parts of ditertiary butyl peroxide and 78 parts of mineral spirits. This mixture was heated to 325° F. to 330° F. and held for six hours. At the end of this period a 15 minute addition of 114 parts of mineral spirits and two parts of ditertiary butyl peroxide was carried out. Holding the resulting reaction mixture for about 13 more hours at 350° F.–370° F. produced a vinyl oxazoline homopolymer having a Gardner-Holdt (25° C.) viscosity of M–N at 50% solids in mineral spirits.

EXAMPLE D

A copolymer was prepared by copolymerizing about 90 parts of the monomer used in Example A with about 10 parts of styrene. The resulting polymer exhibiting a Gardner-Holdt (25° C.) viscosity of $Z_6$–$Z_7$, a Gardner color of seven, an acid value of three, and a density of 8.05 lbs./gallon.

EXAMPLE E

A copolymer of about 50 parts of styrene and about 50 parts of the monomer used in Example A was prepared at 60% solids in xylene. This polymer exhibited a Gardner-Holdt (25° C.) viscosity of S–T, a Gardner color of 12, an acid value of four and a weight per gallon of 7.80 lbs.

EXAMPLE 1

Into a reaction flask equipped with a reflux condenser, mechanical agitator, and addition funnel were added 355 parts of VM&P naphtha, 75 parts of the tall oil fatty acid based oxazoline stabilizer prepared in Example A, and 15 parts of tertiary butyl peroctoate. This mixture was heated to 185° F., held 30 minutes and 150 parts of methyl methacrylate were added over 15 minutes. Following another 30 minutes hold period, an addition of a solution of 462.5 parts of methyl methacrylate, 355 parts of VM&P naphtha, 15 parts of tertiary butyl peroctoate and 3.75 parts of lauryl mercaptan was carried out over two hours. After two additional hours at 183° F. a stable polymeric dispersion resulted having a viscosity of 10 cps., a solids content of 47.1 percent and a weight per gallon of 7.54 lbs.

EXAMPLE 2

A mixture of 350.5 parts of VM&P naphtha, 30 parts of the stabilizer prepared in Example A, and 15 parts of tertiary butyl peroctoate was added to a reaction flask equipped as in Example 1. This mixture was heated to 185° F. and held for 30 minutes. 150 parts of methyl methacrylate were added over 15 minutes and the reaction mixture held for 30 minutes at 185° F. Maintaining this temperature a mixture of 585 parts of methacrylate, 350.5 parts of VM&P naphtha, 15 parts of tertiary butyl peroctoate and 3.75 parts of lauryl mercaptan was added over two hours. After holding the resulting mixture for two additional hours, a dispersion resulted having a viscosity of 10.5 cps., a solids content of 51.5% and a weight per gallon of 9.55 lbs.

A light blue metallic paint was prepared by mixing 70 parts of the above resin with 22.5 parts of di(2-methylcyclohexyl) phthalate, 7.5 parts of butyl 2-methylcyclohexyl phthalate, 7.0 parts of butyl 4-methylcyclohexyl phthalate, 7.0 parts of 2,2,4-trimethyl 1,3-pentanediol monoisobutyrate and 2.5 parts of a phthalo green pigment paste. A similar paint was prepared using a like amount of the resin dispersion prepared in Example 1. Both systems were hand sprayed onto steel panels and evaluated for film properties at various bake schedules—

30 minutes at 200° F., 245° F., and 275° F.— with the following results:

| | 20° gloss (degrees) | | | VM&P naphtha resistance | | | | | | | Xylene resistance | | | |
|---|---|---|---|---|---|---|---|---|---|---|---|---|---|---|
| | 200° F. bake | 245° F. bake | 275° F. bake | 200° F. bake | | | 245° F. bake | | | 275° F. bake | 200° F. bake | 245° F. bake | 275° F. bake | |
| | | | | 30″ | 60″ | 90″ | 30″ | 60″ | 90″ | 90″ | | | | |
| Base dispersion | | | | | | | | | | | 30″ | 30″ | 30″ | 60″ |
| Example 1 | 27 | 48 | 59 | 9–10 | 9–10 | 9–10 | 9–10 | 9–10 | 9–10 | 9–10 | 0 | 6 | 9 | 8 |
| Example 2 | 24 | 46 | 63 | 10 | 10 | 10 | 10 | 10 | 10 | 10 | 4 | 8 | 10 | 9 |

In the above resistance tests 0 is failure while 10 is not affected. All panels exhibited excellent appearance and adhesion and no surface residue.

EXAMPLE 3

Into a reaction flask equipped as in Example 1 were added 705 parts of VM&P naphtha, 30 parts of tertiary butyl peroctoate and 120 parts of a 50% solids solution the copolymer of Example D in a solution of 25% odorless mineral spirits and 75% VM&P naphtha. This mixture was heated to 185° F. and held for 30 minutes. 300 parts of methyl methacrylate were added over 15 minutes and the reactants were held for 30 additional minutes. A mixture of 625 parts of VM&P naphtha, 1140 parts of methyl methacrylate, 30 parts of tertiary butyl peroctoate and 7.5 parts of lauryl mercaptan was added over two hours. 75 minutes later a stable seed-free dispersion resulted.

28 parts of the above dispersion were blended with 4.5 parts of di-(2-methylcyclohexyl) phthalate, 1.5 parts of butyl 2-methyl cyclohexyl phthalate and 1.4 parts of 2,2,4 trimethyl 1,3 pentanediol monoisobutyrate. This blend was drawn down on a steel panel and baked for 15 minutes at 180° F. producing a film having acceptable gloss and flexibility, a pencil hardness of B and excellent adhesion.

EXAMPLE 4

Into a reaction flask equipped as in Example 1 were added 705 parts of VM&P naphtha, 30 parts of tertiary butyl peroctoate and 60 parts of a solution of the copolymer of Example E which had been reduced from its original 60% solids to 50% solids in VM&P naphtha. This mixture was heated to 185° F., held for 30 minutes and 300 parts of methyl methacrylate were added over 15 minutes. The resulting mixture was held at 185° F. for 30 minutes and a two hour addition of 705 parts of VM&P naphtha, 1170 parts of methyl methacrylate, 30 parts of tertiary butyl peroctoate and 7.5 parts of lauryl mercaptan was carried out at 190° F. Two hours later a stable seed free dispersion resulted.

A resin blend was prepared as in Example 3 and baked on a steel panel for 15 minutes at 180° F. producing a film having good gloss and flexibility, excellent adhesion and a pencil hardness of F.

EXAMPLE 5

Into a reaction flask equipped as in Example 1 were added 25.0 parts of the vinyl oxazoline homopolymer prepared in Example B, 113.8 parts of VM&P naphtha, and 5.0 parts of tertiary butyl peroctoate. This mixture was heated to 180° F. and held for 30 minutes. 50 parts of methyl methacrylate were added over 15 minutes at 185° F. and the mixture was again held for 30 minutes. A two hour addition of 187.5 parts of methyl methacrylate, 5.0 parts of tertiary butyl peroctoate and 113.8 parts of VM&P naphtha was carried out. Holding the resulting mixture for 2½ hours at 184° F. produced a stable dispersion.

Satisfactory films resulted when this dispersion was evaluated in the same formula as was used in Example 3. Film adhesion was found to be excellent.

EXAMPLE 6

Example 5 was repeated except that the vinyl oxazoline stabilizer of Example B was replaced with that prepared in Example C. The stable seed free dispersion which resulted was evaluated as in Example 5. The films had good appearance and excellent adhesion.

It is understood that the foregoing detailed description is given merely by way of illustration and that many variations can be made therein without departing from the spirit of this invention.

The embodiments of this invention in which an exclusive privilege or property is claimed are:

1. A synthetic polymeric dispersion, comprising:
   (a) an organic liquid medium;
   (b) a dispersion stabilizer which is a polymer comprised of from about 40 to 100 weight percent of one or more monomers having the general formula.

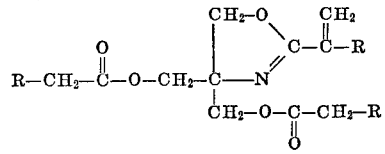

wherein R contains from 2 to 28 carbon atoms, and from about 60 to 0 weight percent of one or more ethylenically unsaturated monomers, wherein said stabilizer comprises from about 1 to about 50 weight percent of the total dispersion solids and is at least swollen by said medium; and
   (c) a dispersed polymer of ethylenically unsaturated monomers, said dispersed polymer being substantially insoluble in said medium.

2. The dispersion of claim 1, wherein said dispersed polymer consists essentially of ethylenically unsaturated monomers selected from the group consisting of alkyl acrylates and alkyl methacrylates.

3. The dispersion of claim 1, wherein R is derived from tall oil fatty acids.

4. The dispersion of claim 1, wherein said stabilizer is soluble in said medium.

5. The dispersion of claim 1, wherein said stabilizer is present in an amount equal to from about 2 to about 15 weight percent of the total dispersion solids.

6. The dispersion of claim 1, wherein said stabilizer consists essentially of from about 50 to about 90 weight percent of a monomer having said general formula and from about 50 to about 10 weight percent of an ethylenically unsaturated monomer which is styrene.

7. A subtrate coated with the dispersion of claim 1.

8. A process for preparing a synthetic polymeric dispersion, which comprises polymerizing ethylenically unsaturated monomers to a polymeric dispersed state in an organic liquid medium, at a temperature of from room temperature to the reflux temperature of said medium and in the presence of from about 0.1 to about 5.0 weight percent, based on total monomers, of a catalyst, and from about 1 to about 50 weight percent, based on total dispersion solids, of a dispersion stabilizer which is at least swollen by said medium and which is a polymer comprised of from about 40 to 100 weight percent of one or more monomers having the general formula,

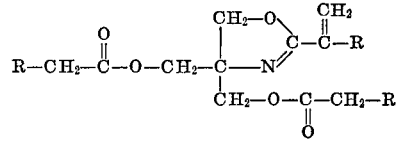

wherein R contains from 2 to 28 carbon atoms, and from about 60 to 0 weight percent of one or more ethylenically unsaturated monomers.

9. The process of claim 8, wherein said polymerizing is carried out at a temperature of from about 125 to about 250 degrees Fahrenheit.

10. The process of claim 8, wherein said stabilizer is soluble in said medium.

11. The process of claim 8, wherein said catalyst is a free radical initiator.

12. The process of claim 8, wherein said polymerizing is carried out in the presence of from 0.1 to 1.5 weight percent, based on total dispersion solids, of a chain transfer agent.

References Cited

UNITED STATES PATENTS

| | | | |
|---|---|---|---|
| 3,488,307 | 1/1970 | Walus et al. | 260—307 |
| 3,248,397 | 4/1966 | Purcell | 260—307 |
| 3,493,635 | 2/1970 | Davis et al. | 260—307 |
| 3,509,235 | 4/1970 | Reimhofer et al. | 260—895 |

DONALD E. CZAJA, Primary Examiner

E. C. RZUCIDLO, Assistant Examiner

U.S. Cl. X.R.

260—307 F, 895, 18 R, 23 CP, 30.4 R, 31.2 R, 32.2 R, 33.4 R, 33.6 UA